3,052,599
STABILIZED ORGANIC PHOSPHATE PESTICIDAL COMPOSITIONS IN FUEL OIL
Richard D. Vartanian, Bound Brook, and Robert B. Fortenbaugh, Gladstone, N.J., assignors to American Cyanamid Company, New York, N.Y., a corporation of Maine
No Drawing. Filed June 15, 1960, Ser. No. 36,142
8 Claims. (Cl. 167—42)

The present invention relates to novel organic pesticidal compositions. More particularly, it relates to stabilized organic phosphate pesticidal compositions in fuel oil and to methods for their preparation.

As is known, certain organic phosphorous-containing compounds are highly effective in controlling the annoying presence of mosquitoes, flies and other pests. For instance, commercially available malathion [chemically identified as S-(1,2-dicarbethoxyethyl) O,O-dimethyl phosphorodithioate] is exemplary of an organic phosphorous-containing compound highly effective in controlling a great variety of pests. A method most effective for distributing insecticides of this class is to dissolve such insecticide in an inert solvent and to thereafter spray a given area. Most widely accepted is a spray method termed "Thermal Aerosol Fogging." In brief, this method involves admixing the insecticide with a relatively inexpensive fuel oil and the mixture then pumped through conduits and directing valves to a vaporization chamber. Superheated steam, heated oxygen or heated air sufficient to vaporize the insecticide-fuel oil mixture is then passed around the said vaporization chamber in order to cause vaporization to occur. Vaporized malathion is ejected as a fog or mist and distributed over a given area.

The latter technique, "Thermal Aerosol Fogging" has made marked inroads in the manner of dispersing insecticides, since it is relatively inexpensive and ordinarily trouble-free with many commercially available insecticides. Unfortunately, this major distribution technique can at times suffer a distinct drawback. In the course of using the aforementioned thermal fogging equipment, it has been noted that frequent shut-down can occur due to clogging of the conduit lines and valves leading to the vaporizing chamber, thereby preventing the fuel oil-insecticide mixture from reaching that chamber. Accordingly, if an insecticidal composition that obviates frequent shut-downs could be provided, it would be highly desirable.

It is, therefore, a principal object of the present invention to provide a novel organic phosphorous pesticidal composition which is incapable of clogging any distributing apparatus. It is a further object of the invention to provide a stabilized organic phosphorous pesticidal composition containing a normally sludge-forming fuel oil. Other objects and advantages will become apparent from a consideration of the following description.

To this end, an organic phosphorous-containing insecticidal compound can be stabilized with surface active phosphatides, such as commercially available lecithin, which may be present in relatively small amounts. Unexpectedly, it has been found that the mixture of the so-stabilized insecticidal composition, when incorporated in a normal sludge-forming fuel oil does not form any deleterious, slimy amorphous precipitate. Rather, a stabilized composition is obtained which can be utilized in any spray apparatus commercially available.

According to the process of the invention, an organic phosphorous-containing insecticide, either alone or in combination with another insecticide, and small quantities of surface active phosphatides, such as lecithin, are separately added to inexpensive fuel oils which normally form a sludge when the phosphorous-containing insecticide alone is added thereto. In general, small amounts equal to from about 1% to about 10% of the insecticide compound or mixture comprising the latter and another insecticide and from about 0.05% to about 5% of lecithin are admixed with the aforementioned fuel oil. Surprisingly, a slimy sludge does not form in the fuel oil although in the absence of the surface active phosphatide a sludge does form. Alternatively, a mixture comprising organic phosphorous containing insecticide and from about 1.0% to about 85% lecithin, based on the weight of the insecticide, may be prepared prior to admixture with the fuel oil.

In general, any commercially available inexpensive fuel oil may be used. Illustrative fuel oils which are characterized by their ability to form slimy sludges on addition of organic phosphorous-containing insecticides are any of those oils which conform to the specifications set forth in Commercial Standards, CS 12-40 for No. 1, 2 and 3 Fuel Oils. Contemplated also are petroleum distillates which generally have an end-boiling point not exceeding 700° F. and preferably below 675° F. for use as diesel fuels.

Advantageously, organic phosphorous-containing insecticides, such as malathion, parathion (O,O-diethyl-O-p-nitrophenyl thiophosphate) and phorate (O,O-diethyl (S-ethylmercaptomethyl) dithiophosphate), may be admixed with surface-active phosphatides either alone or as a mixture of the organic phosphorous-containing insecticide and other insecticides such as lethane. Alternatively, the surface active phosphatides and insecticide may be separately added to the fuel oil and then the insecticide added thereto. In either procedure, small amounts of the organic phosphorous-containing insecticide, usually in the range of from about 1% to about 10%, and preferably of from about 3% to 6%, and the surface active lecithin compound in amounts from about 0.05% to about 5%, and preferably between about 0.1% and 1%, based on the weight of the fuel oil, may be so incorporated therein.

The surface active phosphatides employed in the present invention are compounds collectively known as lecithin. It is defined as a mixture of phosphatides or fat-like compounds containing a phosphoric acid linkage. It is usually separated from unrefined soybean oil and the product so recovered is termed as natural lecithin or commercial lecithin, having the following representative composition:

| | Percent |
|---|---|
| Phosphatidyl choline | 20 |
| Phosphatidyl ethanolamine | 20 |
| Inositol phosphatides | 21.5 |
| Soybean oil | 34 |
| Misc. (sugars, sterols, moisture, etc.) | 4.5 |

As mentioned hereinabove, it is an advantage of the present invention that other than organic phosphorous-containing insecticides may be included in the overall composition so as to enhance the latter. Thus, small amounts, usually in the range of from about 1% to 10% of insecticides, such as 2-butoxy-2'-thiocyanodiethylether (hereinafter referred to as lethane) as well as DDT and aldrin, for instance, may be incorporated in the stabilized, non-sludge forming fuel oil composition of the present invention. In the absence of fuel oil, a concentrate comprising a phosphorous-containing insecticide, another insecticide, lethane for instance, and lecithin may be prepared by admixing the phosphorous-containing insecticide with lethane in amounts equal to from about 10% to about 100% and lecithin in amounts ranging from about 1% to about 85%, all based on the weight of the phosphorous-containing insecticide.

A typical formulation of the organic phosphorous-containing insecticide and other additives is set forth below as exemplary of a good practice.

| | Parts by weight |
|---|---|
| Malathion (technical) | 47.0 |
| Lethane | 37.5 |
| Xylene | 11.5 |
| Commercial lecithin | 4.0 |

In lieu of lethane in the above formulation, an equal amount of malathion may be substituted therefor with equally good results.

Admixing 94 parts of fuel oil with 6 parts of the above formulation results in sludge-free liquids capable of being used in fogging apparatus. It is found that shut-down problems are avoided or minimized in following the methods outlined above.

In order to illustrate the best mode of operation of the present invention, the following examples are presented and these are not to be taken as limitative thereof. Unless otherwise noted, all parts are by weight.

EXAMPLE 1

To 93.95 parts of Fuel Oil No. 2 is added 6 parts of technical grade malathion (90% active) and 0.05 part commercial lecithin. The mixture is then thoroughly stirred. A slimy precipitate is not formed even after 24 hours.

The mixture is then placed in the insecticide tank of a thermal aerosol fogging equipment set-up known as the "Todd Insecticidal Fog Applicator." When the contents of the insecticidal tank are pumped to a vaporization chamber prior to ejection, the conduit lines and valves leading to the chamber remain unobstructed. No shut-down problem develops due to sludge formation, even after continuous and prolonged operation of the fogging apparatus for several weeks.

EXAMPLE 2

Repeating Example 1 in every detail except that premium grade substantially odorless malathion is substituted for technical grade malathion. As in Example 1 above, a precipitate does not form even when introduced into an insecticidal tank of the applicator apparatus.

EXAMPLE 3

Repeating Example 1 in every detail except that the lecithin is omitted. A thick, dark, slimy precipitate is observed within two hours.

Utilizing the formulation of Example 1 in the absence of lecithin, the directing valves in the conduit lines of the aerosol fogging equipment become clogged after several hours of operation and considerable time loss is experienced in order to clean out the apparatus so that insecticidal composition can be vaporized.

EXAMPLES 4–10

The following examples illustrate in tabular form the formation of sludge or absence of it using Fuel Oil No. 2 and additives as indicated.

*Table I*

| Example | Pesticide | Fuel Oil No. 2, percent | Lecithin Additive, percent | Sludge Formation After 24 Hours |
|---|---|---|---|---|
| 4 | 3% Malathion, 3% Lethane. | 94 | None | Considerable. |
| 5 | do | 93.95 | 0.05 | None. |
| 6 | 3% Parathion | 94 | None | Some. |
| 7 | do | 96.9 | 0.1 | None. |
| 8 | 6% Phorate | 94 | None | Some. |
| 9 | do | 93.9 | 0.1 | None. |
| 10 | 6% Malathion | 89 | 5 | Do. |

It is an advantage of the present invention that the chemical stability of malathion in the presence of both fuel oil and the lecithin additive remains unaffected even after three weeks, indicating excellent stability.

We claim:

1. A composition consisting essentially of in combination a normal sludge-forming fuel oil, an insecticidal organic phosphorous-containing compound and lecithin, the amount of insecticidal compound being present in an amount of from about 1% to 10% and lecithin being present in an amount equal to about 0.05% to about 5%, based on the weight of the fuel oil.

2. The composition according to claim 1 wherein the insecticidal compound is S-(1,2-dicarbethoxyethyl)-O,O-dimethyl phosphorodithioate.

3. The composition according to claim 1 wherein the insecticidal compound is O,O-diethyl-S-(ethyl thiomethyl) phosphorodithioate.

4. The composition according to claim 1 wherein the insecticidal compound is O,O-diethyl-o-p-nitrophenyl phosphorodithioate.

5. In the stabilization of an insecticidal organic phosphorous-containing compound when added to normal sludge-forming fuel oil, the improvement which consists essentially of: adding to said fuel oil from about 0.05% to 5% of lecithin and from about 1% to about 10% of an insecticidal organic phosphorous-containing compound based on the weight of the fuel oil.

6. The process according to claim 5 wherein the insecticidal compound is S-(1,2-dicarbethoxyethyl)-O,O-dimethyl phosphorodithioate.

7. The process according to claim 5 wherein the insecticidal compound is O,O-diethyl-S-(ethyl thiomethyl) phosphorodithioate.

8. The process according to claim 5 wherein the insecticidal compound is O,O-diethyl-O-p-nitrophenyl phosphorodithioate.

References Cited in the file of this patent

UNITED STATES PATENTS

| | | |
|---|---|---|
| 2,808,320 | Rudel et al. | Oct. 1, 1957 |
| 2,898,267 | Lindner | Aug. 4, 1959 |
| 2,516,477 | Moberly | July 25, 1960 |

FOREIGN PATENTS

| | | |
|---|---|---|
| 776,314 | Great Britain | June 5, 1957 |